(12) United States Patent
Pascual Garcia et al.

(10) Patent No.: US 11,071,964 B2
(45) Date of Patent: Jul. 27, 2021

(54) ELECTROCHEMICAL REACTOR TO CONTROL THE PH IN MINIATURIZED DIMENSIONS

(71) Applicant: LUXEMBOURG INSTITUTE OF SCIENCE AND TECHNOLOGY (LIST), Esch sur Alzette (LU)

(72) Inventors: Cesar Pascual Garcia, Esch sur Alzette (LU); Mathieu Gerard, Esch sur Alzette (LU); Jean Sebastien Thomann, Esch sur Alzette (LU)

(73) Assignee: LUXEMBOURG INSTITUTE OF SCIENCE AND TECHNOLOGY (LIST), Esch sur Alzette (LU)

( * ) Notice: Subject to any disclaimer, the term of this patent is extended or adjusted under 35 U.S.C. 154(b) by 261 days.

(21) Appl. No.: 16/064,697

(22) PCT Filed: Dec. 20, 2016

(86) PCT No.: PCT/EP2016/081931
§ 371 (c)(1),
(2) Date: Jun. 21, 2018

(87) PCT Pub. No.: WO2017/108796
PCT Pub. Date: Jun. 29, 2017

(65) Prior Publication Data
US 2018/0369779 A1 Dec. 27, 2018

(30) Foreign Application Priority Data

Dec. 21, 2015 (LU) .......................................... 92920

(51) Int. Cl.
*B01J 19/00* (2006.01)
(52) U.S. Cl.
CPC ....... *B01J 19/0093* (2013.01); *B01J 19/0046* (2013.01); *B01J 2219/005* (2013.01);
(Continued)

(58) Field of Classification Search
None
See application file for complete search history.

(56) References Cited

U.S. PATENT DOCUMENTS 6,340,588 B1 * 1/2002 Nova .................... B01J 19/0046
435/287.1
7,816,151 B2 10/2010 Guttman et al.
(Continued)

OTHER PUBLICATIONS

Frasconi et al "Electrochemically Stimulated pH Changes: A route to Control Chemical Reactivity"; J. AM. Chem. Soc.; 2010; 132; 2029-2036.
(Continued)

*Primary Examiner* — Salil Jain
(74) *Attorney, Agent, or Firm* — Cantor Colburn LLP

(57) ABSTRACT

The present invention is related to an electrochemical reactor (1) and a microfluidic platform (20) comprising this reactor (1), controlling pH in a closed environment, wherein this reactor (1) comprises at least one cell (2), wherein each cell (2) containing at least one micro-well (3*a*) able to contain a liquid and reagents and a cap (7) to close the said cell (2) and wherein the cell (2) further comprises at least one working electrode (5) producing reversible REDOX reactions.

21 Claims, 7 Drawing Sheets

(52) U.S. Cl.
CPC .................. *B01J 2219/0093* (2013.01); *B01J 2219/00317* (2013.01); *B01J 2219/00596* (2013.01); *B01J 2219/00653* (2013.01); *B01J 2219/00713* (2013.01); *B01J 2219/00722* (2013.01); *B01J 2219/00725* (2013.01); *B01J 2219/00731* (2013.01); *B01J 2219/00853* (2013.01); *B01J 2219/00966* (2013.01)

(56) References Cited

U.S. PATENT DOCUMENTS

| | | | |
|---|---|---|---|
| 8,114,589 B2 | 2/2012 | Sosnowski et al. | |
| 9,085,461 B2 | 7/2015 | Dubin et al. | |
| 9,168,527 B2 | 10/2015 | Robinson et al. | |
| 2002/0188221 A1* | 12/2002 | Sohrab | A61B 5/157 600/573 |
| 2003/0082444 A1* | 5/2003 | Kuhr | H01M 10/0436 429/149 |
| 2003/0135030 A1* | 7/2003 | Guttman | B01J 19/0093 530/402 |
| 2003/0168349 A1* | 9/2003 | Bohm | G01N 31/10 205/628 |
| 2005/0148064 A1 | 7/2005 | Yamakawa et al. | |
| 2006/0275927 A1* | 12/2006 | Dubin | B82Y 30/00 438/1 |
| 2007/0155015 A1* | 7/2007 | Vassanelli | C12N 15/87 435/461 |
| 2011/0195258 A1* | 8/2011 | Fan | G02B 3/14 428/447 |
| 2012/0276541 A1* | 11/2012 | Lian | G01N 35/026 435/6.12 |
| 2012/0312384 A1* | 12/2012 | Robinson | B03C 5/02 137/13 |
| 2015/0132742 A1* | 5/2015 | Thuo | B01L 3/502707 435/5 |
| 2018/0059132 A1* | 3/2018 | Christey | G01N 35/00693 |

OTHER PUBLICATIONS

Freitas, Robert A. Nanomedicine vol. I: Basic Capabilities. Austin, Texas: Landes Bioscience, 1999 (Part 1 of 11).
Freitas, Robert A. Nanomedicine vol. I: Basic Capabilities. Austin, Texas: Landes Bioscience, 1999 (Part 10 of 11).
Freitas, Robert A. Nanomedicine vol. I: Basic Capabilities. Austin, Texas: Landes Bioscience, 1999 (Part 11 of 11).
Freitas, Robert A. Nanomedicine vol. I: Basic Capabilities. Austin, Texas: Landes Bioscience, 1999 (Part 2 of 11).
Freitas, Robert A. Nanomedicine vol. I: Basic Capabilities. Austin, Texas: Landes Bioscience, 1999 (Part 3 of 11).
Freitas, Robert A. Nanomedicine vol. I: Basic Capabilities. Austin, Texas: Landes Bioscience, 1999 (Part 4 of 11).
Freitas, Robert A. Nanomedicine vol. I: Basic Capabilities. Austin, Texas: Landes Bioscience, 1999 (Part 5 of 11).
Freitas, Robert A. Nanomedicine vol. I: Basic Capabilities. Austin, Texas: Landes Bioscience, 1999 (Part 6 of 11).
Freitas, Robert A. Nanomedicine vol. I: Basic Capabilities. Austin, Texas: Landes Bioscience, 1999 (Part 7 of 11).
Freitas, Robert A. Nanomedicine vol. I: Basic Capabilities. Austin, Texas: Landes Bioscience, 1999 (Part 8 of 11).
Freitas, Robert A. Nanomedicine vol. I: Basic Capabilities. Austin, Texas: Landes Bioscience, 1999 (Part 9 of 11).
Gary Stix ("Little Big Science." Understanding Nanotechnology (p. 6-16). Scientific American, Inc, and Byron Preiss Visual Publications, Inc: 2002.
International Search Report; International Application No. PCT/EP2016?081931; International Filing Date Dec. 20, 2016; dated Mar. 13, 2017; 4 pages.
Ratner, Daniel and Mark. Nanotechnology: A Gentle Introduction to the Next Big Idea. Pearson Education, Inc: 2003.
V. Privman, O. Zavalov ett al. "Networked Enzymatic Logic Gates with Filtering: New Theoretical Modeling Expressions and Their Experimental Application"; J. Phys. Chem. B; 2013; 117; 14928-14939 (DOI: 10.1021/jp408973g).
Wispelway, June. "Nanobiotechnology: The Integration of Nanoengineering and Biotechnology to the Benefit of Both." Society for Biological Engineering (Special Section): Nanobiotechnology.
Written Opinion of the International Searching Authority; International Application No. PCT/EP2016/081931; International dated Dec. 20, 2016; dated Mar. 13, 2017; 6 pages.

* cited by examiner

ELECTROCHEMICAL REACTOR TO CONTROL THE PH IN MINIATURIZED DIMENSIONS

CROSS REFERENCE TO RELATED APPLICATIONS

This is a U.S. national stage of PCT International Patent Application No. PCT/EP2016/081931 filed on 20 Dec. 2016. Priority under 35 U.S.C. § 119(a) and 35 U.S.C. § 365(b) is claimed from Luxembourg Application No. 92920 filed on 21 Dec. 2015, the disclosure of all of which is also incorporated herein by reference, in its entirety.

FIELD OF THE INVENTION

The present invention is in the field of electronic lab on chip and is related to a (preferably miniaturized) reactor, device or apparatus, to a microfluidic platform comprising this reactor, device or apparatus, to a method for producing (the elements of) such reactor, device or apparatus and to the use of this reactor, device, apparatus or platform to regulate pH and that can be applied in various technologies that require improving chemical and biochemical reactions, in molecules spotting, in (bio)polymers and nanoparticles (NP) synthesis and detection by electrochemistry or in the production of micro arrays, sensors as well as molecular computers and molecular memories.

BACKGROUND OF THE INVENTION

The pH, proton concentration or acidity can regulate numerous chemical and biological transformations for example the assembly of molecules or the enzyme activity. pH regulation has been proposed for removing electrochemical protecting groups from several molecules, useful in combinatorial synthesis for example nanoparticles or polymers, such as peptides, nucleic acids (nucleotides) and polysaccharides. pH is also the regulator of a number of enzyme mediated reactions or it can directly act as a catalyser in different chemical reactions. In order to use acidity changes in a number of applications based on those reactions, including those that require high throughput synthesis and detection, the control of the pH over a high density spatial distribution must be achieved.

The control of the pH refers to the generation of acidity or proton release as well as to its measurement over the space and the control of the proton diffusion to maintain pH contrast over enough time to perform such reactions.

STATE OF THE ART

In prior art, pH control is used for electrochemical synthesis (of polymers) with multiplexed approaches.

The international patent application WO 93/22480 describes a microarray synthesis controlled by pH and an electrolyte and using a substrate (microscopic slide) mechanically placed over an array of parallel electrodes.

U.S. Pat. No. 6,444,111 B1 describes the Electrochemical solid phase synthesis of sequences of polymers by a method using a porous substrate and a buffering solution to prevent the electrochemically generated reagents from leaving the locality of the used electrode and wherein the buffering solution can prevent pH changes upon small addition of acids or bases.

US Patent application 2006/0275927 discloses a method and apparatus to fabricate polymer arrays on patterned wafers comprising a plurality of dyes. The applied method is based upon the use of electrochemical synthesis generating an acid on a working electrode to form molecules without (acid labile) protecting groups and that by applying a specific potential to a confinement electrode, one may confine protons adjacent to the working electrode and prevent diffusion controlled spreading of protons to a neighbouring working electrode.

This US Patent application mentions the use of micro wells and electrodes to confine a generated electrochemical reagent. However, in the described method, the proton donor molecules are dissolved and REDOX reactions occurring in the electrode may modify its properties. In this way, reaction is not reversible and electrodes deteriorate. US patent application 2008/0108149 A1 discloses a solid phase layer (a matrix polymer with dispersed electro-synthesizers) capable of generating an acid, wherein proton diffusion is slowed down by the polymer viscosity. Also in this case the proton distribution is not completely controlled.

U.S. Pat. No. 8,338,097 B2 discloses methods and devices for detecting binding on an electrode surface, for electrochemically synthesizing polymers and for detecting the binding of polymers This US patent further mentions physical separation of the synthesis spots. However, scales are in the order of mm, which are not compatible with local release of protons.

The state of the art has tackled proton diffusion mainly through the use of porous materials and scavenging buffers. We propose confinement of the reaction.

The real problem that needs to be solved is then: pH generation. In General, pH is generated from molecules in solution that will electro-polymerize on a substrate. In a confined system molecules must be fixed, and then one issue is enough proton generation. A second issue is that protons cannot interact with the counter electrode because it would result in reduction of protons into gaseous H2.

Aims of Aspects of the Invention

There is a need for improving the control and production of (bio)chemical reactions, especially enzyme activity, molecular spotting, polymers or nanoparticles synthesis or detection by increasing the efficiency of pH control in confined miniaturized environment, especially upon large pH ranges.

An aspect of the present invention aims at providing a new miniaturized reactor (device or apparatus) as well as a microfluidic platform comprising this reactor (device or apparatus) and its production process which do not present the drawbacks of the state of the art. In particular, an aspect of the present invention aims at providing such reactor (device or apparatus) used for controlling or obtaining several specific (bio)chemical reactions) through an improved control of the spatial distribution of protons in a small volume (preferably in a volume in the range of a few pico litters to a few femto litters and below), wherein these specific reactions can occur, by generation of a high pH contrast, preferably upon large pH (preferably acidic) value ranges (i.e. from pH 7 to pH 3 or less), but within this dedicated miniaturized environment inside this reactor (device or apparatus).

An additional aim of an aspect of the present invention is to obtain such reactor (devise or apparatus) allowing (preferably numerous (50 or more) reversible control steps of the spatial distribution of this generated pH, inside its dedicated miniaturized environment. A further aim of an aspect of the present invention is to provide such reactor (device or apparatus) having a confined miniaturized environment and requiring low concentration of reagents and adapted for multiplexed reactions and detection, especially a reactor (device or apparatus) in the form of high-density chemical cell arrays, that are suitable for generating reverse redox reactions, and that could improve various industrial processes (especially production delay and efficiency), in particular for an improved regulation of chemical and biological reactions, for improving the (preferably high throughput) synthesis and/or detection of (bio)molecules, nanoparticles or (bio)polymers, such as peptides, nucleotide sequences and/or polysaccharides upon a solid support surface, preferably with the format of (micro)arrays, for the improved production of nanoparticles or polymers library and/or for the production of microarrays, sensors or molecular memories or molecular computers.

SUMMARY OF THE INVENTION

The present invention is related to an electrochemical reactor, device or apparatus, controlling pH upon a scale of at least one pH value, preferably more than two pH values, in a closed environment, wherein this reactor, device or apparatus comprises at least one cell which contains, preferably consist of, at least two connected micro-wells able to contain a liquid and reagents, and a cap which is configured to open and to close the cell and wherein the cell further comprises a (large surface) working electrode producing reversible Redox reactions. The micro-well comprises as liquid, at least a proportion of protic solvents that will be the carrier of the generated protons and which is preferably selected from the group consisting of water, ammonia or related compounds, acetic acid or an alcohol, such as ethanol or methanol, or a mixture of these protic solvents. Advantageously, in the reactor according to the invention, the cell is made of, preferably consist of, at least two or three connected micro-wells separated by a diffusion barrier, wherein the first micro well comprises the working electrode and wherein the second micro-well preferably comprises a counter electrode and possibly a third micro-well may comprise a reference electrode, all these electrodes being connected by an electrolyte. Preferably, in the reactor according to the invention, the diffusion barrier is selected from the group consisting of a channel, a porous material or a combination of both. Preferably also, the volume of the diffusion barrier is smaller than the volume of the (large surface) working electrode. More preferably, the volume of the diffusion barrier amounts to less than 50%, still more preferably to less than 10% and possibly even to less than 2%, of the volume of the working electrode.

In the reactor according to the invention, the (large surface) working electrode is preferably functionalized with reversible REDOX molecules deposited upon a platinum (Pt) electrode, a gold (Au) electrode, a conductive carbon Carbone (C) or a composite material of these elements. Preferably these reverse REDOX molecules are thin films made of REDOX couples exchanging electrons and more preferably are selected from the group consisting of families of aniline, hydroquinone, pyrrole or any of their polymers or a bis-aniline-cross linked nanoparticles (NP) composite, or the pi-conjugated polymers described in WO2011/102801. In addition, the counter electrode can be further functionalized and prepared in a deprotonated state by an external electrode, so that only protonation and deprotonation of selected and added molecules occurs and alternatively pH can change between connected micro-wells.

In addition, in the reactor according to the invention the cell and/or the cap may further comprise a pH sensor, preferably consisting of a plasmonic nanostructure, a nanowire field effect transistor or ion sensitive field effect transistor.

Advantageously, in the reactor according to the invention, the cap is able, when in open configuration, to allow flow of (gaseous or liquid) fluids between cells or between cell(s) micro-wells, and to avoid (gaseous or liquid) fluid flow in closed configuration. Furthermore, the cap comprises, preferably consist of, a flat rigid or semi rigid substrate, preferably made of glass or quartz, corundum (sapphire), metal oxides preferably transparent metal oxides or plastics, preferably transparent plastics this substrate being coated with one or more hydrophobic layer(s) and possibly with one or more hydrophilic layer(s).

Preferably, the hydrophilic layer is made of polyethylene glycol (PEG) or PEG functionalized with quartenary ammonium and the hydrophobic layer is selected from the group consisting of a self-assembled monolayer of silanes, polymeric organosilicone, lipid nanoparticles or perfluorated compounds.

According to a preferred embodiment of the present invention the cap comprises one or more layer(s) of colloidal nanoparticles obtained from lipid droplets, further stabilized by a surfactant selected from the group consisting of polyethoxylated surfactant(s), functionalized polyethoxylated surfactant(s), lecithin or a mixture thereof; wherein the polyethoxylated surfactant(s) preferably comprise(s) a thiol function or a thiopyridone function for crosslinking and where the substrate was previously functionalised preferably with thiosilane functions for covalent attachment.

In the reactor according to the invention, the cap is preferably transparent.

According to another preferred embodiment of the invention, the cap is functionalized with plasmonic reporter elements, preferably made of gold, silver or platinium. Furthermore, the reactor according to invention may comprise a proton membrane covering the working electrode to protect it from degradation from the chemical reagents taken part in the intended processes (synthesis, spotting . . . ).

In the reactor, the cell(s), preferably the first micro-well of the cell(s) further comprises beads of suitable size to reduce the internal volume of the cell(s) or micro-well(s). In addition, the reactor, device or apparatus may further comprise detection means of binding between (bio) polymers or nanoparticles in the cell(s).

Preferably, the reactor according to the invention comprises an array of at least 4, 16, 64 or more cells.

according to a last preferred embodiment of the invention, the working electrodes are connected to an array of metal oxide semiconductor field effect transistors (MOSFETS), as voltage provider.

Another aspect of the present invention is related to a microfluidic platform (plant or apparatus), such as, e.g., a microfluidic Lab-On-Chip (LOC) system that integrates one or several laboratory functions on a single chip of only a few square millimetres to a few square centimeters in size, comprising:
    the reactor (device or apparatus) according to the invention,
    means for a lifting of the reactor substrate and a binding of cell(s) micro-wells walls against the reactor cap and inlet and outlet microfluidic channels for an introduction and a removing of reagents and (gaseous and liquids, preferably aqueous liquids) fluids in reactor cell(s)

In this microfluidic platform, the cells are advantageously surrounded by an elastic gasket.

A last aspect of the invention, is related to the use of the reactor, device or apparatus or the microfluidic platform, plant or apparatus according to the invention, for a production and/or the detection of (bio) polymers or (polymeric) nanoparticles, possibly upon solid support surfaces having specific arrays pattern.

Preferably, these (bio) polymers are selected from the group consisting of nucleic acids polymers, peptides, polysaccharides or a mixture thereof.

Other molecules or combination of molecules can be also detected or produced in the reactor, device or apparatus or microfluidic platform, plant or apparatus upon various defined solid supports according to specific miniaturized patterns by methods well known by the skilled person.

The present invention will be described in details in the following description in reference to the enclosed figures presented as non-limiting illustrations of the present invention.

SHORT DESCRIPTION OF THE DRAWINGS

DETAILED DESCRIPTION OF EMBODIMENTS OF THE INVENTION

Figure 5:
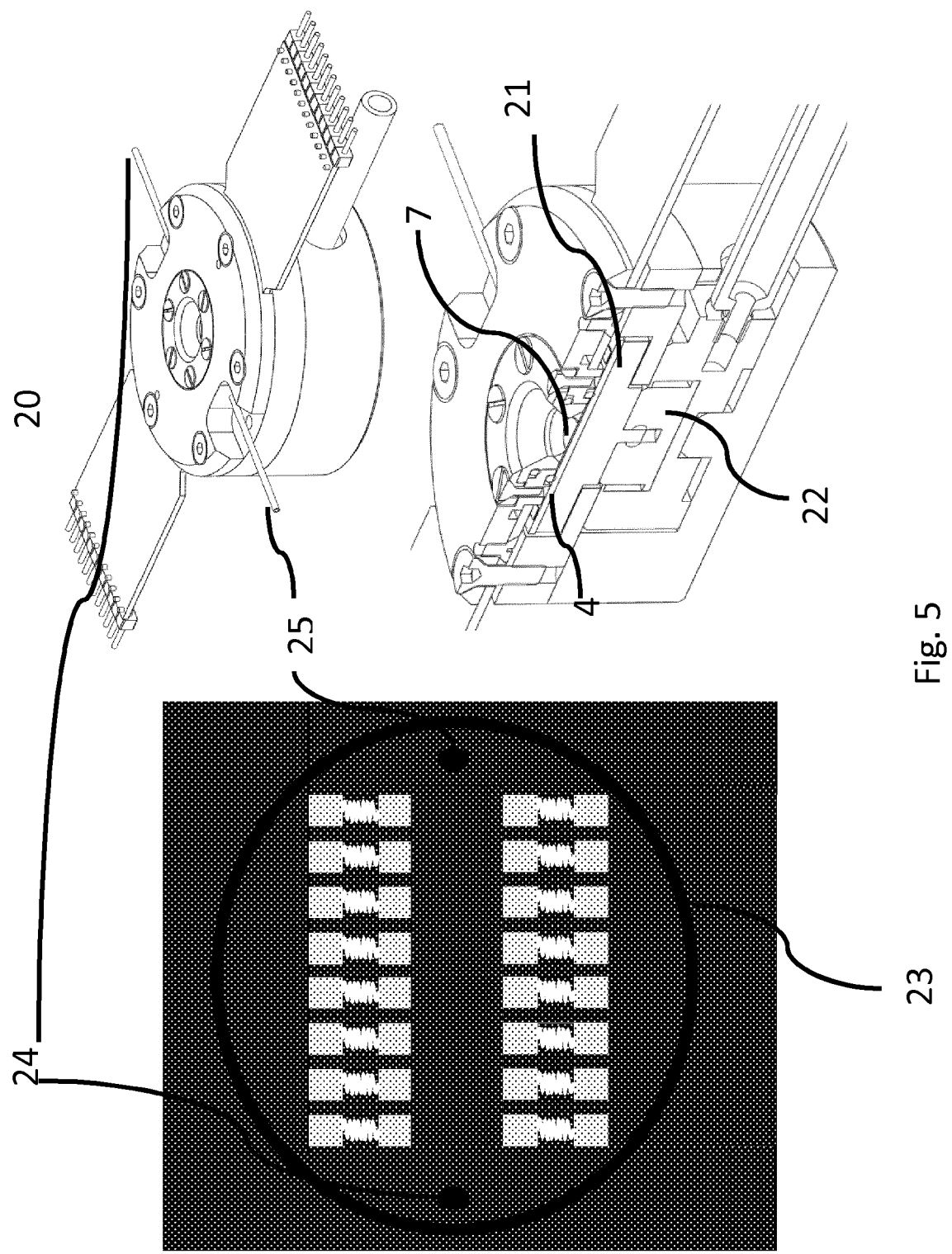
FIG. 5 represents different schematic views of the microfluidic platform according to the invention.
Figure 6:
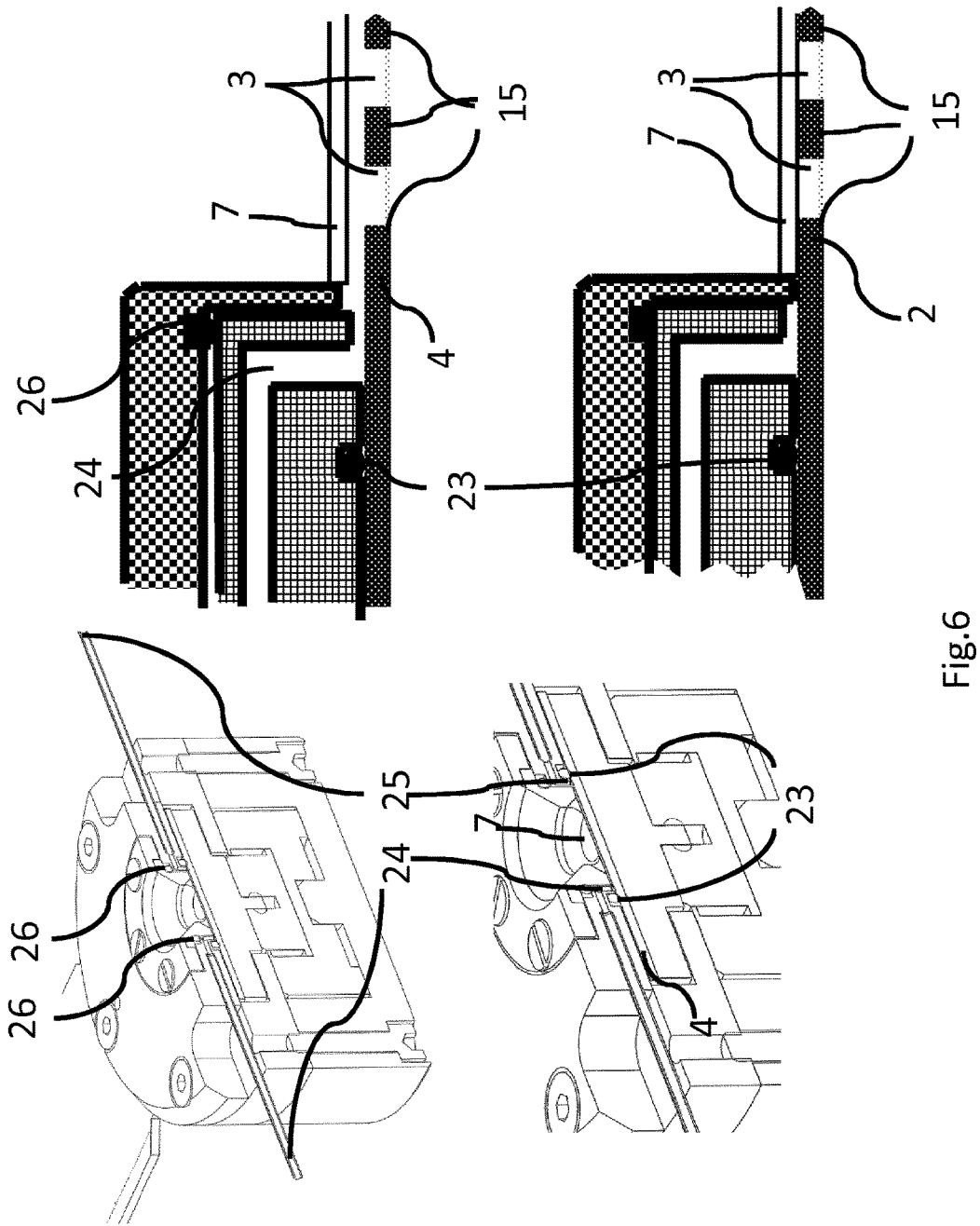
FIG. 6 represents the opening and closing positions of the reactor allowing exchange of reagents and pH control respectively.

As represented in the enclosed FIGS. 5 and 6, the inventors propose a novel lab on chip or microfluidic platform, plant or apparatus 20, comprising a miniaturized and high spatial density electrochemical reactor 1, device or apparatus used for an efficient proton control in a small volume present in the reactor 1 by applying currents in (large surface) working electrodes 5, possibly nanostructured surface working electrodes or others elements, such as porous and possibly coated, conducting electrodes, preferably electrodes made with cross-linked nanoparticle that advantageously produces (generates) reversible REDOX reactions in this confined small volume environment of the reactor 1 according to the invention.

Figure 1:
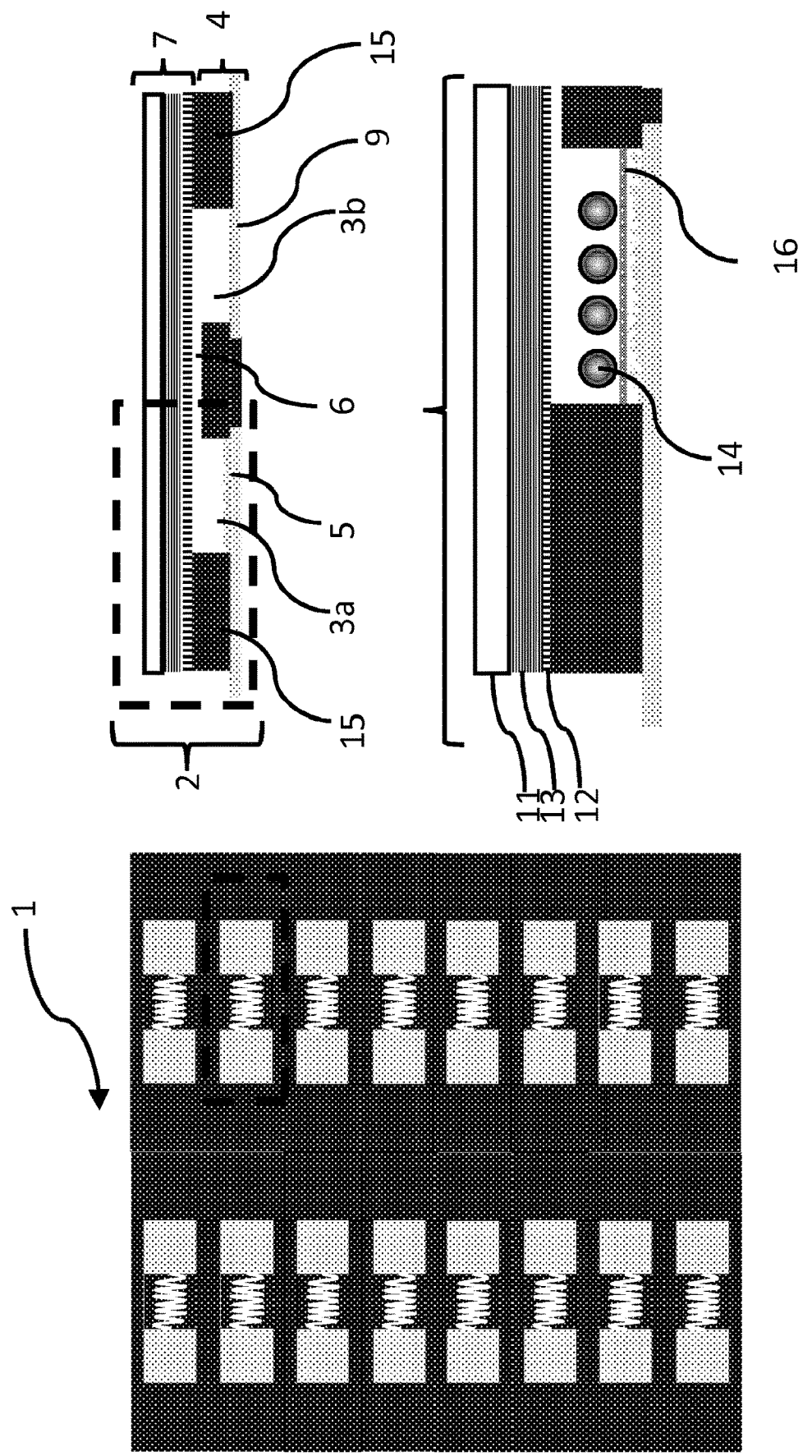
FIG. 1 represents a view of the different elements of the reactor and its cap according to the invention.
Figure 2:
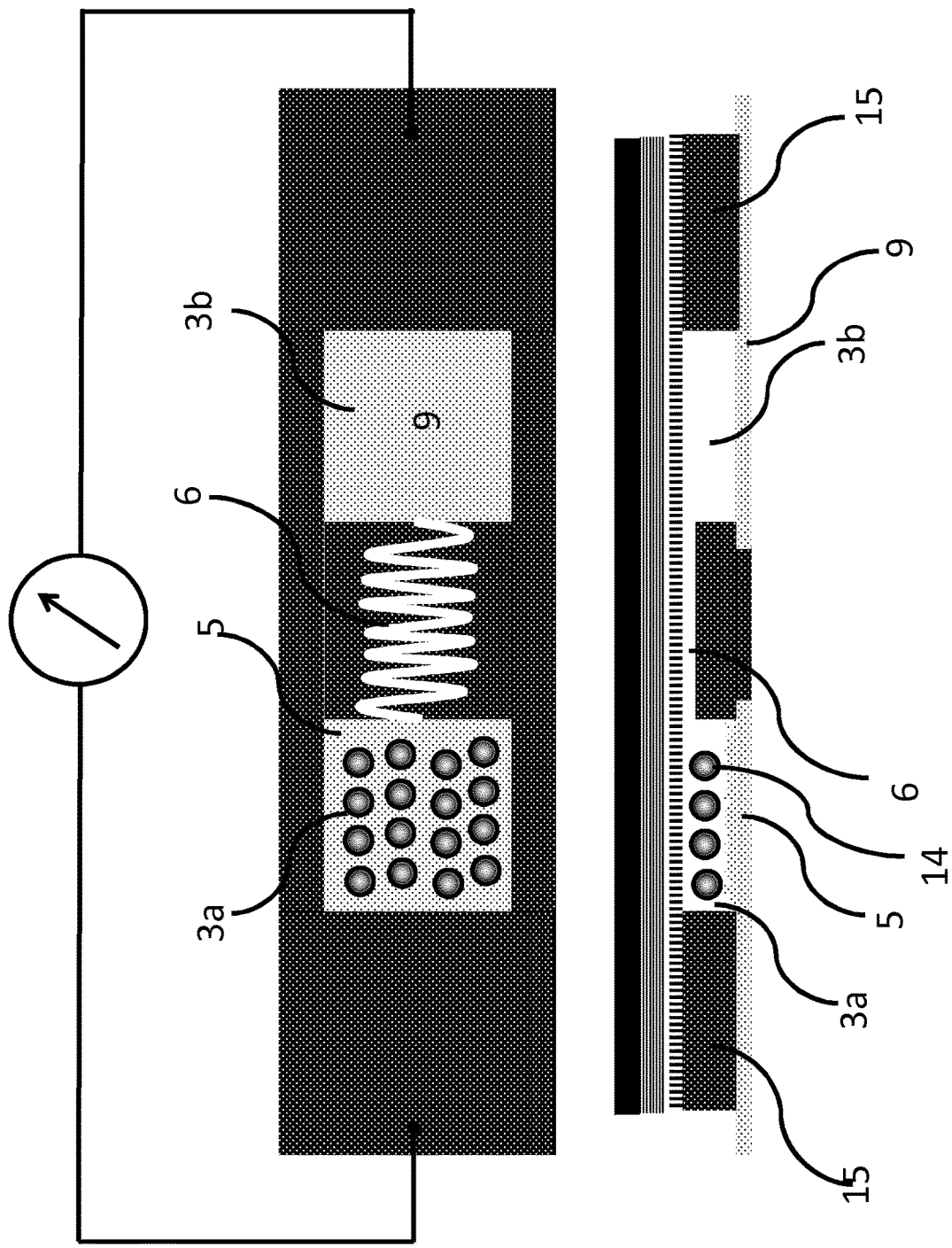
FIG. 2 represents schematically the working electrochemical reactor according to the invention.

This electrochemical reactor 1, device or apparatus as represented in the FIGS. 1 and 2 is made of at least one, preferably a high plurality (or array) of ("electrochemical") cell(s) 2, each cell 2 comprising, preferably or consisting of two parts:
 a first part being a base substrate 4 that contains at least two or three)connected micro-well(s) 3a and 3b and possibly 3c, but separated by a diffusion barrier 6, present in the cell 2 to avoid reduction (by a counter electrode 9) of the generated species produced by the working electrode 5, and
 a second part being a cap 7, that hermetically closes this cell 2.

In the cells 2, the micro well(s) 3a & 3b volume is advantageously comprised between a few microliters and a few femtoliters, but is able to contain suitable liquid, preferably a protic solvent and dissolved reagents preferably dissolved reagents or an electrochemical reaction in the cell micro-well 3a.

The first micro-well 3a of the cell 2 further contains at least one addressable working large surface electrode 5, preferably large surface provided by (adapted to) a flat design of the cell 2 or nanostructured shape of the electrode(s) 5 which is functionalised with molecules producing (generating) reversible REDOX reactions producing or accepting protons.

In a preferred embodiment, the reactor 1 is made of multiple cells 2, and multiple working electrodes 5 wherein each cell comprises at least one working electrode 5, all these working electrodes 5 being possibly connected to a voltage provider, such as an array of METAL OXIDE FIELD EFFECT TRANSISTORS (MOSFET) in an addressable configuration.

The second micro well 3b of the cell 2 contains a counter electrode 9 that may be unique to each working electrode 5 or may be shared between different cells 2, and the third micro well 3c may comprise a reference electrode 10.

As represented in FIG. 2, these working electrodes 5 and counter electrodes 9 (and reference electrode 10) are connected, but are also separated from each other by the diffusion/migration barrier 6. Therefore, this configuration, when suitable current and voltage are applied between the working electrode 5 and counter electrode 9 and possibly voltage with the reference electrode 10, is used to regulate spatial distribution of protons and therefore the pH within this cell 2, preferably in the first volume or micro-well 3a.

This diffusion/migration barrier 6 allows that the intended reaction for each application occurs before the generated hydrogen ions or protons reach the counter electrode 9. This diffusion/migration barrier may be a channel, possibly in the form of a serpentine or a spiral element (as represented in the figures), a porous layer or a combination of these configurations.

The position of the micro wells 3a & 3b connected to their diffusion barrier 6, especially in the form of a channel, a serpentine or a spiral element can be adapted by the person skilled in the art, according to the design of the cells 2, according to the application required, as well as according to the most efficient mode of production of the reactor cells 2.

This diffusion barrier 6 has preferably a volume much smaller than the volume containing the working electrode 5 in order to do not generate a too rapid drop of the pH in the micro well 3a. Therefore, all protons generated in the REDOX reactions contribute mostly to the pH change in the first micro-well 3a containing the working electrodes 5. In these conditions, if the number of protons produced exceeds the protons already present (i.e. the final estimated pH with this approximation is much lower than the original one by one or two pH units), the lowest pH produced can be estimated from the current applied or with the surface functionalization:

$$\mathrm{pH} = -\log[H^+] \sim -\log\left[\frac{I \cdot t}{F \cdot V}\right] = -\log\left[\frac{A \cdot S}{A \cdot h}\right] = -\log\left[\frac{S}{h}\right]$$

$I$ = applied current  $A$ = Working electrode Area $t$ = time applied current  $S$ = Surface functionalization F = Faraday constant  e = electron charge V = cell volume  h = sample height The resistance of the barrier 6, determined by its shape and dimensions and by the electrolyte containing in it, can produce a voltage drop. Due to the small currents involved in the generation of pH, this is small, but it is taken into account so that the voltage drop (IR) does not produce side reactions.

In a miniaturized configuration, migration or diffusion of protons to the counter electrode 9 would cause their reduction and conversion into gaseous $H_2$ at the surface of the counter electrode. For this reason, a diffusion barrier 6 is present in the reactor 1 that accounts for an effective distance that can be obtained considering diffusion through the barrier.

The effective length of the barrier 6 needed to isolate can be taken into account considering the speed of the reaction of interest and the speed of the generated hydrogen ions.

Furthermore, with such used working electrodes 5, reactions are reversible allowing an undetermined number, preferably 50 or more of reactions, preferably reversible reactions. The reactor, device or apparatus 1 according to the invention further comprises the counter electrode 9 above-mentioned and possibly a reference electrode 10, which advantageously may be constructed in a different cell with its own diffusion barrier connected to the working electrode 5 (see FIG. 7).

The term "(large surface) working electrode" means that due to a planar design of the volume of the working electrode 5, a nano-structuration of such electrode or a combination of both, it is possible to allocate enough REDOX activated molecules so that the total concentration of hydrogen ions produces a significant change of the pH (typically at least 1 pH unit). To assure the reversibility of the REDOX reaction that exchange protons to modify the pH, thin films may be used.

Figure 4:
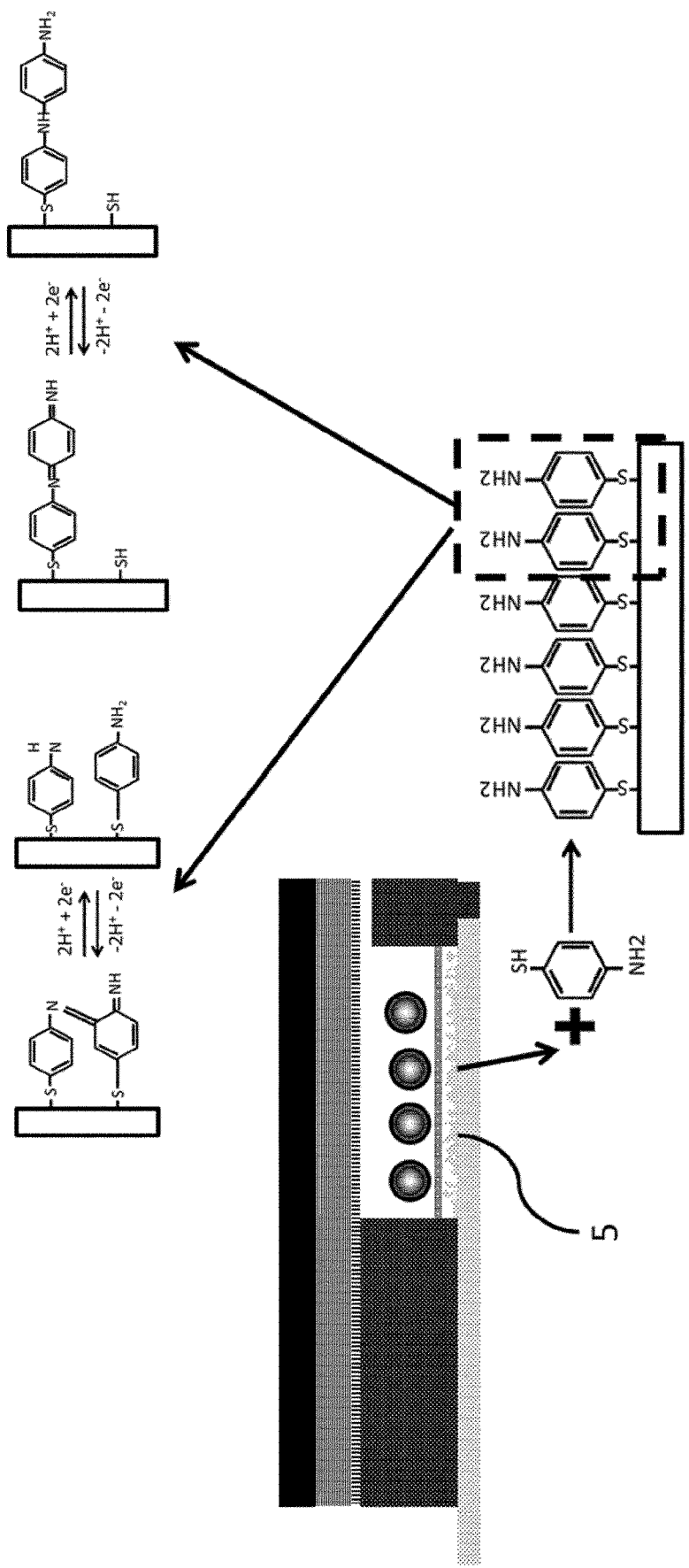
FIG. 4 represents an example of functionalisation of the working electrode according to the invention.

The FIG. 4 represents a preferred example of a reversible working electrode 5 fabricated by employing self-assembled monolayers of aminothiolphenol or other conductive polymers of the same (polyphenol) group preferably polythiophene, polyaniline, polyacetylene, . . . capable of exchanging protons. Nano-structuration may be achieved by different methods like roughening the surface of the electrode or functionalising with nanoparticles to create nano-composites. The used working electrodes are preferably selected from the group consisting of gold (Au), conductive carbon (C) and platinum (Pt) electrodes or composites of these elements. Gold (Au), Platinum (Pt) or conducting carbon (C) electrodes are preferred, because they do not suffer alteration such as oxidation or reduction and because they can be easily functionalized by addition of nanostructures or composites elements. Functionalized electrodes with nano-composites, preferably bis-aniline-cross-linked gold (Au) nanoparticle (NP) composites, preferably deposited upon a Platinum (Pt) film, supported by a gold (Au) to control the reversible production of pH were described in 2013 by Frasconi et al (J. Am. Chem. Soc. 132, 2010).

In the Frasconi publication, it was demonstrated a pH change of 1.5 (theoretical calculations applying equations above would provide a final pH of 3 accounting for a change of pH of 4 units, using a cell of 1 micron height). These numbers could further be increased considering the use of the beads that are used to reduce the liquid volumes or are used to create solid phase elements applied for the synthesis of new molecules, preferably polymers, nanoparticles . . . upon their solid support surfaces. The greater the pH changes, the more flexibility over the reactions can be used and a greater yield may be achieved. As each cell 2 present in the reactor, device or apparatus 1 according to the invention is isolated to avoid proton diffusion, the pH change strongly depends on the dimension, size or volume of the cell 2. In order to achieve significant pH changes, each unit cell 2 must have a sufficiently small height.

The (large) surface of the working electrodes 5 is advantageously nanostructured to enhance the surface area and increase the number of active molecules producing acidity. The method for nano-structuring may include growth of metals in porous materials, decomposition of metals, growth of grass fields of conductive nanowires or nanotubes or the creation of nano-composites using nanoparticles. This publication cannot be translated to miniaturized dimensions without considering the reduction of H+ protons.

An example of the reactor 1 according to the invention is represented in FIG. 5, wherein the cells 2 are physically isolated (not only separated). In order to achieve this feature, it is essential to include a closable cap, preferably a functionalized closable cap 7 that in closed position avoids the exchange of protons between cells 2 or with the environment, but this cap 7, in an open position, allows flow of liquids, preferably aqueous liquids, and reagents in the process stages where the acid is not being produced or in specific steps, like in cleaning steps or distribution, addition or removing of reagents, preferably through a washing step by a suitable liquid, preferably an aqueous medium.

Figure 3:
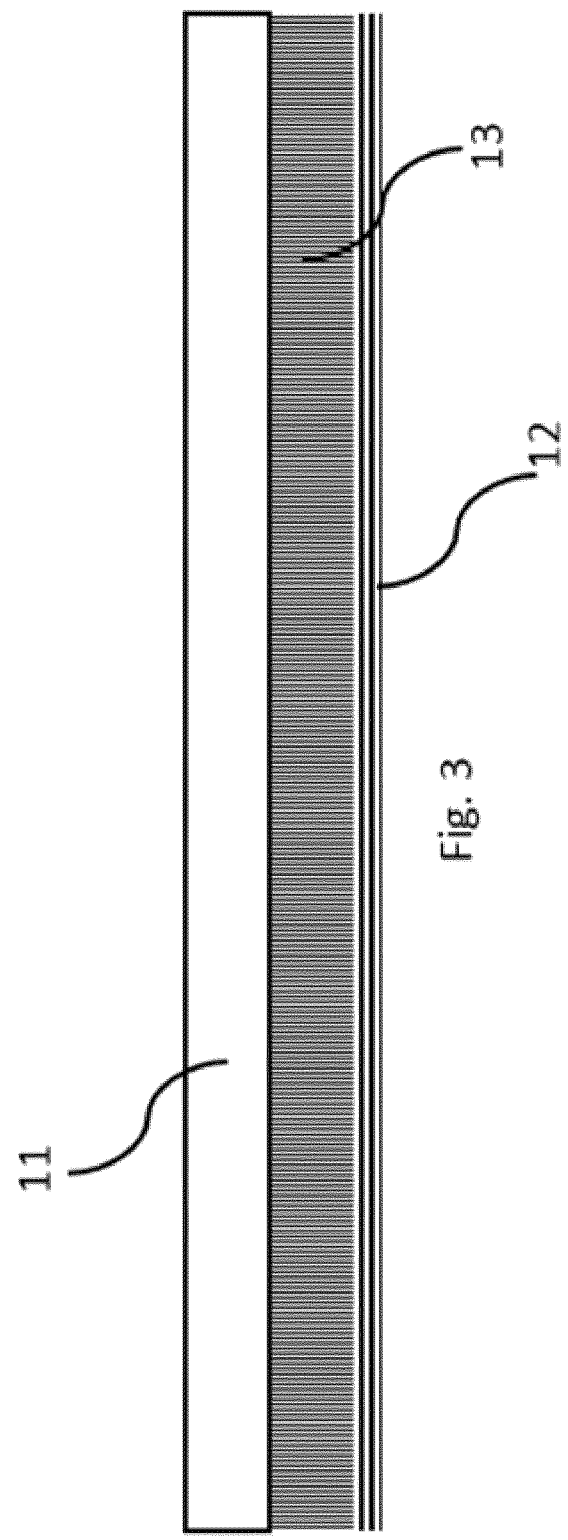
FIG. 3 represents a view of the cap layers according to the invention.

The physical isolation is achieved by using a movable cap 7 that opens the cells 2 to exchange reagents and liquids and closes it to isolate them during the acid production and the subsequent possible processes driven by acidic medium. The cap 7 must therefore allow flows of liquids, preferably aqueous liquids in a microfluidic environment (and through means described hereafter in the microfluidic platform 20) when changing reagents in the cell 2 and during the cleaning stages, while it must secure the proton confinement on stages when the cell 2 is closed by the cap 7. An example of a possible cap 7 is represented in FIG. 3. This cap 7 includes (or consist of) at least a flat rigid or semi-rigid substrate 11, preferably made of a glass, preferably polished glass, quartz, corundum (sapphire), transparent metal oxides or one or more transparent polymer(s), like TOPAS® Cyclic Olefin Copolymer (COC), epoxy . . . layers, possibly used after UV & Ozone addition treatment, and preferably further recovered (functionalized) by a multifunctional coating having a thickness greater than planarity and roughness of the substrate 11 and smaller than the micro-wells 3a and 3b enabling water confinement, as well as a reversible adhesion between the cap 7 and the substrate 4.

This coating contains deformable polymers or supramolecular coating, such as, but not exclusively, Polydimethylsiloxane, preferably PDMS or any other hydrophobic silicone, alginate, wax or another elastomeric material, which enable reversible adhesion on the substrate 11, preferably made of inorganic or organic layers, typically $SiO_2$ or SU8 (epoxy resin), PDMS or any other silicone layer, preferably a layer from about 50 to about 150 nm, that can be further coated by a thin layer of aminosilane, preferably APTES (3-Aminopropyl)triethoxysilane) that is frequently used in the process of silanization. By this way, Silicone can be advantageously covered by a hydrophilic layer 12, preferably a polyether, like the polyethylene glycol (PEG) layer or a polyethylene glycol (PEG) derivative such as PEG functionalized with a quaternary ammonium, more preferably a layer having between about 5 nm to about 10 nm, which contains quaternary amine groups to maximize the electrostatic adhesion between the substrate 11 and the adhesive layer.

According to an alternative of the invention, the hydrophilic layer is made of polyethylene glycol (PEG) or quaternary polyethylene glycol (PEG) ammonia and the hydrophobic layer is made of polymeric organosilicone or colloidal nanoparticles obtained from lipid droplets, further stabilized by a surfactant (preferably selected from the group consisting of polyethoxylated surfactant(s), functionalized polyethoxylated surfactant(s), preferably surfactant(s) terminated by a thiol (SH) function or a thiopiridone function) and/or lecithin). Gold (Au) nanoparticles (NPs) or rods can be also associated on the top of this cap 7 for pH SERS SENSING.

When the cap 7 is closed, its hydrophilic layer 12 would be compressed by the micro-wells (3a and 3b) walls 15 against its hydrophobic layer 13, avoiding the fluid circulation and isolating the protons in the cell 2. On the other hand, the hydrophilic layer 12 of this cap 7 favours the liquid circulation and the wetting of the reactor 1 walls.

According to a preferred embodiment, the cap 7 of the reactor 1 (device or apparatus) may be transparent to allow optical measurements in each cell 2, preferably each micro-well 3a or 3b. The addition of a transparent substrate 11 functionalized with plasmonic probes allows for multiplexed surface enhance Raman spectroscopy (SERS) interrogation. The characteristics of the last layer present at the surface of the cap 7 and in contact with the medium present in the cell 2 is also selected by the skilled person, to provide the best substrate for a possible synthesis or detection of (bio)polymers or nanoparticles upon the surface of the cap 7.

In order to further increase the impact of the immobilized molecules on the pH, the fluid volume of each cell 2, preferably each micro-well may be decreased by using means occupying the cell(2) 2 or micro well 3a volume, preferably through the addition of beads 14 (or others suitable solid support structures) made of polymers, metal, silica or any other material of suitable size able to be easily incorporated into the cell(s) 2 or the micro-well 3a to reduce their volume.

These beads 14 are advantageously actively bounded to the cell of the micro well walls 15 or base (as a part of the electrode or by using dedicated spaces for the functionalization) by chemical bonds or magnetic field(s) (in case they are magnetic nanoparticles (NPs)), are confined by the cap 7 or are allowed a flow away of fluids or liquids, preferably aqueous liquids, after each chemical reaction step, possibly through microfluidic outlet 25 described hereafter These beads 14 may also be used as a solid support substrate for the solid-phase synthesis reactions and to accelerate reactions in the micro-well 3a.

Different identical addressable cells 2 may be included into the reactor, device or apparatus 1 according to the invention, to perform different reactions, preferably consecutive reactions or to control the spatial distribution of pH, preferably production and distribution of protons. The obtained reactor device or apparatus 1 according to the invention can be used for electrochemical synthesis of (bio) polymers such as peptides, nucleotide sequences, polysaccharides or others plastic structure, for specific chemical spotting, for the development and the testing of novel detection schemes and (SERS) sensors, for producing molecular computers or molecular memories, etc.

In the reactor 1 and method according to the invention, the pH is adjusted (controlled) independently. In this way, the reactor, device or apparatus 1 allows multiplexed reactions by distributing the same reagent(s) over all the cells, but activating or deactivating specific cells 2 or specific areas of these cells 2, where the reaction must take place or not take place.

The electrochemical assembly of (bio) polymers is one of the foreseen applications of the reactor 1, device or apparatus or the microfluidic platform, plant or apparatus 20 according to the invention. Both the synthesis of (bio) polymers or chemical spotting use a target present upon a solid substrate surface that may be the surface of the beads 14 surface, preferably the polymeric or metallic beads surface possibly present in the micro-well 3a, a portion of the cap 7 surface or a portion of the surface walls 15 of the micro-well 3a, including part of the working electrode surfaces 5.

In order to protect the working electrodes 5, due to the fact that the REDOX molecules are fixed into these working electrodes 5, a proton membrane 16 may cover the working electrode 5 to avoid its contamination and its degradation.

If the cap 7 surface as above described, is used as substrate surface, preferably a substrate surface for suitable synthesis, it can be easily removed and used in a second experiment away from the cell 2 of the reactor 1, device or apparatus according to the invention.

Figure 7:
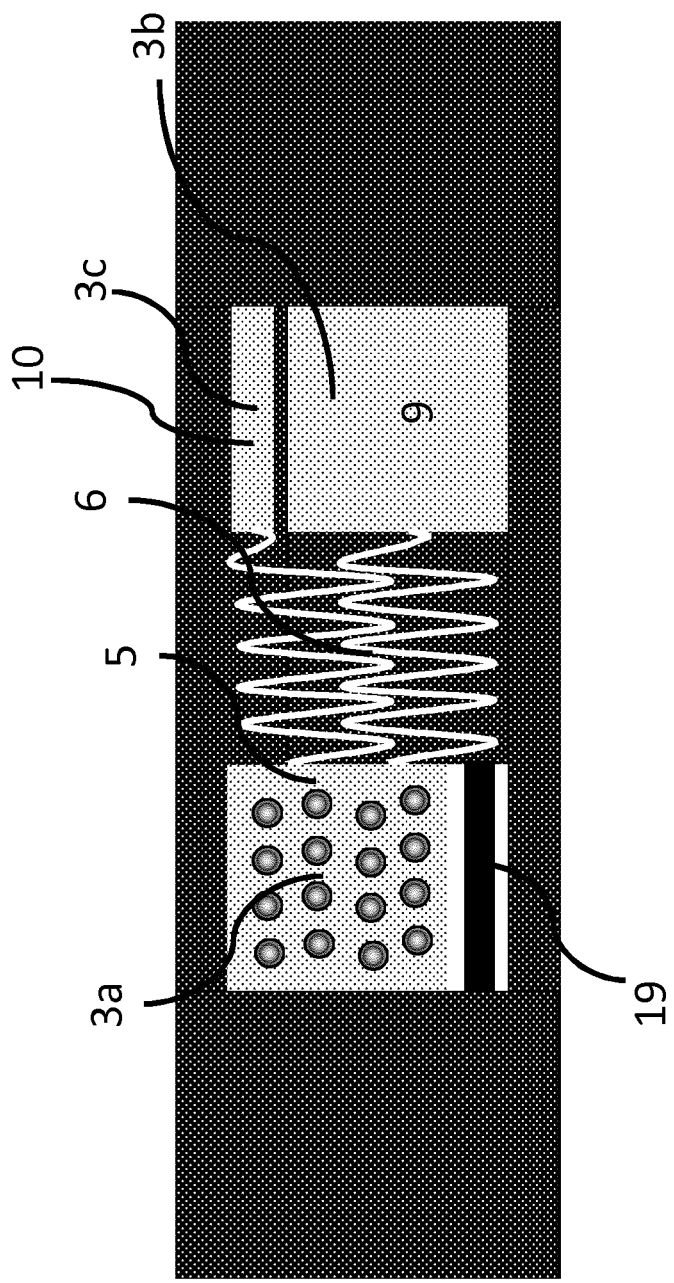
FIG. 7 represents the electrochemical reactor according to the invention and further including reference electrode and electrochemical sensing.

The cell(s) 2 may also include additional electrodes, including a reference electrode or pseudo-reference electrode 10 possibly present in a third micro-well 3c or pH sensor, like an Ion sensitive field effect transistor (ISFET) 17 included in the working electrode cell 3a, of the cell 2 (see FIG. 7). Such ISFET pH sensor usually will comprise a source, a drain, a gate, an insulator (in contact with the electrolyte) and possibly a reference electrode, which may be substituted by one of the previous electrodes of the cell 2 with fixed bias. In a preferred configuration this ISFET may be made of a semiconductor nanowire. The sensor could be used to monitor the voltage and correct the pH in case of proton leaks from neighbouring cells.

The reactor 1, device or apparatus according to the invention can advantageously achieve a higher throughput and a higher control of a modified pH than the other methods and devices of the state of the art, thanks to the efficient physical isolation of the numerous (array of) cells 2 of micro-meter scale, preferably below few tenths of μm in diameter and by multiplication (array) of these cells 2 in the same reactor, device or apparatus 1, because this cells 2 isolation avoids that buffering solutions have a negative impact on the pH control. Also since the proton diffusion in other devices and methods of the state of the art is not completely supressed, previous methods have only demonstrated microarrays with features above 25 μm (PLoS ONE 1(1): e34. doi:10.1371/journal.pone.0000034).

One possible simple functionalization that would provide reversible reactions would be using four Aminothiolphenol self-assembled monolayers (SAM). The sample is placed into a solution of this molecule during enough time to form an ordered SAM. Then the sample can be electro-polymerised or UV polymerised to create reversible REDOX species. Alternatively a higher surface functionalization may be achieved functionalising the electrodes as described by Frasconi et al. Other functionalization using nanostructured electrodes, and molecules of the same family of phenols and pyrroles may be used.

When the cells 2 of the reactor 1, device or apparatus according to the invention are isolated, by a cap closing, the pH change can be provided by a thin conductive layer, instead of an electrolyte in solution. In this way, the electrodes should not change in volume nor deteriorate and the REDOX reaction is also advantageously reversible. Since the number of molecules, preferably nucleotides, amino acids, saccharides, attached to the working electrodes 5 was usually very small compared to the volume of liquid in the reactor cell 2, the configuration becomes useful only in reduced sized (miniaturized) reactors using an appropriate height according to the equation above, where the surface to volume ratio is maximized and therefore the pH controlled change possible.

Another aspect of the present invention concerns the method for obtaining (fabricating or producing) the reactor, device or apparatus 1 according to the invention. Following a specific design or pattern established for the cells 2 or the reactor by the person skilled in the art, on an insulating $SiO_2$ substrate 4 that will form the cell micro-wells 3a & 3b, metallic contacts (Au or Pt) for the electrodes 5 and 9 are deposited by lithography and/or thin film techniques. On top, a dielectric is deposited using organic layers, preferably layers that may be spin-casted or inorganic layers, preferably deposited on planar contacts, lithographed and then etched. A channel between the formed working electrode 5 and its counter electrode 9 is obtained by e-beam lithography or any other suitable and known method applied for the production of miniaturized elements production, more preferably ion beam lithography or combination of optical, or x-ray lithography and etching . . . . The channel may be long enough (preferably with the shape of a serpentine or a spiral) or may be filled with a porous material to increase this conductivity to form the diffusion barrier 6.

A last aspect of the invention concerns a microfluidic platform, plant or apparatus 20 or Lab-On-Chip system represented in the FIGS. 5 and 6 that comprises the elements of the electrochemical reactor, device or apparatus 1 according to the invention and further comprises means for a lifting of the reactor substrate 4 and a binding of the micro-wells 3a, 3b & 3c walls 15 against the cap 7, preferably by using movement of a piston 21 of a pneumatic actuator 22. The microfluidic platform 20 further comprises microfluidic inlet/outlet channels or connections preferably linked to the reservoirs 24 & 25 for the introduction and the removing of reagents and fluids, preferably aqueous washing fluids added or present in the cells 2 of the reactor 1 according to the invention. Preferably, the area of the reactor cell(s) 2, wherein suitable fluids or liquids, preferably aqueous liquids or fluid(s) through these inlet/outlet channels 24 & 25 may be inserted is limited by an elastic gasket 23 that surrounds the cell(s) 2 and that may compress the cell(s) 2 against the cap 7 at special allocations. This gasket 23 will isolate these fluid(s) present in cell(s) or in the gasket 23 surroundings them from external contact(s). Additional elastomeric elements 26 forming an internal gasket are also present in the microfluidic platform.

By releasing the pressure generated from the pneumatic actuator 22, these fluids or liquids, preferably aqueous fluid(s) or liquid(s) may flow from microfluidic inlet channel 24 into the cell(s) 2 and/or into the internal volume surrounding the cell(s) 2 and from the cell(s) 2 and/or from the internal volume surrounding these cells (s) 2 towards the microfluidic outlet channel 25. When the piston 21 of the pneumatic actuator 22 generates a pressure upon the reactor substrate 4, the cells 2 are closed and these (liquids, preferably aqueous liquids) fluids are confined in the cells 2 for the reaction(s). Preferably, in the microfluidic platform 20 according to the invention, the cap 7 is transparent for an easy detection of the pH monitoring and the visualization chemical reactions performed in the cells 2, as well as for the detection of bounded molecules, such as (bio) polymers upon solid support surfaces, for instance the detection of nucleotides sequences upon corresponding nucleotides probes fixed upon the surface of the beads 14.

In the microfluidic platform according to the invention, the working electrode(s) 5, counter electrode(s) 9 and reference electrode(s) 10 are linked preferably through connected pads, to electrical contacts 26 or to the MOSFET array that can apply suitable currents at suitable voltage, generating the pH shifting in the cell(s) 2 to obtain the required chemical reaction(s) in the micro-well(s) 3a of the reactor 1 according to the invention. As represented in the figure, the various elements of this microfluidic platform 20 are fastened together by screws.

EXAMPLES

Example 1: Molecules Spotting

1. At the initial stage, in the reactor 1 according to the invention, a target substrate was functionalised with acid labile protecting groups to receive specific molecules upon an activation current that has modified the pH in the cells 2.
2. In a second step, the cap 7 was closed, pH was modified into the cells, where the spotted reagent was placed. In this way, cells became unprotected.
3. After a cleaning step, all the cells had the cap 7 open and had allowed a flowing of the buffering solution and water for cleaning, but some of these cells 2 were activated by removing protecting groups.
4. The reagent to be spotted was commonly distributed, but only stuck on the unprotected sites.
5. A final cleaning step was used to remove the excess of reagent.

These steps were repeated to spot different reagents provided that subsequent molecules did not react with the ones already placed. In that case, a chemical protecting step of the reagents to be spotted, can be used. As they would be isolated during the preparation of the next steps, acid was preferably used at the end to unprotect the final microarray.

For some reactions, the pH modification just acts as a catalyser of the bounding reactions, avoiding the need for protection groups and allowing direct spotting by pH control, preferably through a modification according to eq. 1).

For a polymers synthesis used to create molecular libraries or arrays, a similar spotting method was used to synthesise biopolymers, including nucleotides, peptides or saccharides. In this case, the reagents instead of being molecules were protected monomers. The monomers were spotted with the same procedure and they were de-protected for the following synthesis step. The method was very similar to the one described in U.S. Pat. No. 6,444,111 B1, but using the isolated cells of the reactor and microfluidic platform with reversible electrodes according to the invention.

Example 2: Production of Molecular Memories and Logics: Dense Arrays of Biopolymers are at the basis of many proposed novel computational methods. The reactor or the microfluidic platform according to the invention was used to fabricate an ordered library of some biopolymers that have been described in the schemes for preferably non-binary bio-computation, preferably mainly made of DNA, more advantageously made of at least 4 different bases (ATCG), but also peptides, advantageously made of at least 20 different amino acids and saccharides and was used for the creation of molecular memories and logics as described by Gary Stix ("Little Big Science." Understanding Nanotechnology (p6-16). Scientific American, Inc, and Byron Preiss Visual Publications, Inc: 2002; by Freitas, Robert A. Nanomedicine Volume I: Basic Capabilities. Austin, Tex.: Landes Bioscience, 1999; by Ratner, Daniel and Mark. Nanotechnology: A Gentle Introduction to the Next Big Idea. Pearson Education, Inc: 2003; by Wispelway, June. "Nanobiotechnology: The Integration of Nanoengineering and Biotechnology to the Benefit of Both." Society for Biological Engineering (Special Section): Nanobiotechnology; and by V. Privman, O. Zavalov, at al. J. Phys. Chem. B, 117 (48), 14928-14939. DOI: 10.1021/jp408973g).

The person skilled in the art may obtain a non-binary memory by reading the arrangements using different chemical reactions, (like the production of protons by a polymerase assisted reaction. It is also advantageous to modify molecules state with pH modifications, and acidity itself may modify the interaction among different reaction sites of molecules.

The invention claimed is:

1. An electrochemical reactor controlling pH over at least one pH unit, in a closed environment, said reactor comprising:
    one or more cell(s), each cell containing two connected micro-wells separated by a diffusion barrier, wherein the first micro-well comprises a working electrode functionalized with reversible REDOX molecules deposited upon the working electrode and the second micro-well comprising a counter electrode,
    a cap which is configured to open and close said cell and
    a proton membrane covering the working electrode.

2. The electrochemical reactor according to the claim 1, wherein the diffusion barrier is selected from the group consisting of a channel, a porous material and a combination of both.

3. The electrochemical reactor according to claim 1, wherein the working electrode is selected from the group consisting of gold electrode, Platinum electrode, Carbon electrode, and Carbon electrode covered by a platinum film.

4. The electrochemical reactor according to claim 1, wherein the reversible REDOX molecules are selected from the group consisting of aniline, hydroquinone, pyrrole, and pyrrole polymers.

5. The electrochemical reactor according to claim 1, wherein the cell or the cap further comprises a pH sensor.

6. The electrochemical reactor of claim 5, wherein the pH sensor is selected from the group consisting of a plasmonic nanostructure, nanowire field effect transistor, and an ion sensitive field effect transistor.

7. The electrochemical reactor according to claim 1, which further comprises a reference electrode.

8. The electrochemical reactor according to claim 7, which further comprises a third micro-well separated from the first micro well by a diffusion barrier and wherein the said third micro well comprises the reference electrode.

9. The electrochemical reactor according to claim 1, wherein the cap, in open configuration allows flow of fluids between cells or between cell(s) micro-wells and avoids fluid flow in closed configuration.

10. The electrochemical reactor according to claim 1, wherein the cap comprises a flat rigid substrate or semi rigid substrate, coated with hydrophobic layers.

11. The electrochemical reactor according to claim 10, wherein the flat rigid substrate or the flat semi-rigid substrate is made of a material selected from the group consisting of glass, quartz, corundum, metal oxides and plastics.

12. An electrochemical reactor controlling pH over at least one pH unit in a closed environment said reactor comprising:
    one or more cell(s) each cell containing two connected micro-wells separated by a diffusion barrier, wherein the first micro-well comprises a working electrode functionalized with reversible REDOX molecules deposited upon the working electrode and the second micro-well comprising a counter electrode, and
    a cap which is configured to open and close said cell wherein the cap comprises a flat rigid substrate or semi-rigid substrate, coated with a hydrophobic layer, and wherein the flat rigid substrate or the flat semi-rigid substrate comprises a hydrophilic polyethylene glycol layer and wherein the hydrophobic layer is a self-assembled monolayer of silanes, polymeric organosilicone, or lipidic nanoparticles.

13. An electrochemical reactor controlling pH over at least one pH unit, in a closed environment, said reactor comprising:
    one or more cell(s), each cell containing two connected micro-wells separated by a diffusion barrier, wherein the first micro-well comprises a working electrode functionalized with reversible REDOX molecules deposited upon the working electrode and the second micro-well comprising a counter electrode, and
    a cap which is configured to open and close said cell wherein the cap comprises a flat rigid substrate or semi-rigid substrate, coated with a hydrophobic layer, and wherein the hydrophobic layer is made of one or more layer(s) of colloidal nanoparticles obtained from lipid droplets, further stabilized by a surfactant selected from the group consisting of polyethoxylated surfactant, lecithin, and a mixture thereof.

14. The electrochemical reactor according to claim 13, wherein the polyethoxylated surfactant comprises a crosslinking thiol functional group or a crosslinking thiopyridone functional group.

15. The electrochemical reactor according to claim 1, wherein the cap is transparent.

16. The electrochemical reactor according to claim 1, wherein the cap is functionalized with plasmonic reporter elements.

17. The electrochemical reactor according to claim 1, wherein the cell further comprises beads.

18. The electrochemical reactor according to claim 1 comprising an array of at least 4, 16, 64 or more cells.

19. The electrochemical reactor according to claim 1, wherein the working electrodes are connected to voltage provider made of an array of metal oxide semiconductor field effect transistors (MOSFETS).

20. A microfluidic platform comprising the electrochemical reactor according to claim 1,
    a pneumatic actuator for lifting a substrate of the electrochemical reactor and binding the walls of the micro-wells of the one or more cell(s) against the cap, and
    inlet and outlet microfluidic channels for introduction and removing of reagents and fluids in the one or more cell(s).

21. The microfluidic platform according to claim 20, wherein the cells are surrounded by an elastic gasket.

* * * * *